United States Patent
Janse van Rensburg et al.

(10) Patent No.: US 9,503,166 B2
(45) Date of Patent: Nov. 22, 2016

(54) SYSTEM AND METHOD FOR COORDINATED MIMO SWITCHING (CMS) IN TDD/FDD-LTE

(71) Applicant: Futurewei Technologies, Inc., Plano, TX (US)

(72) Inventors: Cornelius Dawid Janse van Rensburg, Wylie, TX (US); Iyad Alfalujah, Bedminster, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/660,651

(22) Filed: Mar. 17, 2015

(65) Prior Publication Data
US 2016/0277082 A1 Sep. 22, 2016

(51) Int. Cl.
*H04B 7/04* (2006.01)
*H04W 72/04* (2009.01)
*H04L 5/14* (2006.01)

(52) U.S. Cl.
CPC .......... *H04B 7/0456* (2013.01); *H04B 7/0417* (2013.01); *H04L 5/14* (2013.01); *H04W 72/042* (2013.01)

(58) Field of Classification Search
CPC  H04B 7/0417; H04B 7/0426; H04B 7/0452; H04B 7/0413
USPC ........................ 375/267, 299; 455/561, 562.1
See application file for complete search history.

(56) References Cited

U.S. PATENT DOCUMENTS

| | | | |
|---|---|---|---|
| 8,095,169 B2 * | 1/2012 | Ohwatari | H04B 7/0417 455/452.1 |
| 2010/0272211 A1 | 10/2010 | Ohwatari et al. | |
| 2012/0230264 A1 | 9/2012 | Zhang et al. | |
| 2013/0315050 A1 * | 11/2013 | Zhang | H04B 7/0417 370/203 |
| 2014/0064203 A1 | 3/2014 | Seo et al. | |
| 2015/0016560 A1 | 1/2015 | Hotecha et al. | |
| 2015/0023202 A1 | 1/2015 | Shattil et al. | |

OTHER PUBLICATIONS

Wunder et al., Self-Organizing Distributed Inter-Cell Beam Coordination in Cellular Networks with Best Effort Traffic, WiOpt 2010, pp. 295-302.*
Kasparick et al., Autonomous Distributed Power Control Algorithms for Interference Mitigation in Multi-Antenna Cellular Networks, European Wireless 2011, Apr. 27-29, 2011 Vienna, Austria, pp. 25-32.*

* cited by examiner

*Primary Examiner* — Betsy Deppe
(74) *Attorney, Agent, or Firm* — Slater Matsil, LLP (57) ABSTRACT

An eNB is configured to perform a method for coordinating downlink power per layer at an eNB in a multiple-input, multiple-output (MIMO) network. The method includes receiving feedback from at least one UE; calculating a plurality of MIMO gradients based on the received feedback; changing a power per layer according to the calculated MIMO gradients; and exchanging gradient power information between the eNB and at least one neighboring eNB.

21 Claims, 6 Drawing Sheets

SYSTEM AND METHOD FOR COORDINATED MIMO SWITCHING (CMS) IN TDD/FDD-LTE

TECHNICAL FIELD

The present disclosure relates generally to wireless communications, and more particularly, to a system and method for coordinated MIMO switching (CMS) in Time Division Long Term Evolution (TD-LTE) and Frequency Division Duplex LTE (FDD-LTE).

BACKGROUND

Communication using a multiple-input multiple-output (MIMO) channel offers a significant capacity gain over a single-input single-output (SISO) channel. In many MIMO systems, interference is the fundamental capacity limiting factor. Cooperation and coordination of MIMO transmission at base stations have the potential to boost the capacity of today's cellular systems. Achieving both large capacity gains and improving cell-edge user performance is a major challenge in Third Generation Partnership Project (3GPP) Long Term Evolution (LTE) systems.

SUMMARY

According to one embodiment, there is provided a method for coordinating downlink power per layer at an enhanced nodeB (eNodeB or eNB) in a multiple-input, multiple-output (MIMO) network. The method includes receiving feedback from at least one user equipment (UE); calculating a plurality of MIMO gradients based on the received feedback; changing a power per layer according to the calculated MIMO gradients; and exchanging gradient power information between the eNB and at least one neighboring eNB.

According to another embodiment, there is provided an eNB configured for coordinating downlink power per layer in a multiple-input, multiple-output (MIMO) network. The eNB includes at least one memory and at least one processor coupled to the at least one memory. The at least one processor is configured to receive feedback from at least one UE; calculate a plurality of MIMO gradients based on the received feedback; change a power per layer according to the calculated MIMO gradients; and exchange gradient power information between the eNB and at least one neighboring eNB.

According to yet another embodiment, there is provided a non-transitory computer readable medium embodying a computer program. The computer program includes computer readable program code for receiving feedback from at least one UE; calculating a plurality of MIMO gradients based on the received feedback; changing a power per layer according to the calculated MIMO gradients; and exchanging gradient power information between the eNB and at least one neighboring eNB.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The following documents and standards descriptions are hereby incorporated into this disclosure as if fully set forth herein:

G. Golub and C. V. Loan, "Matrix Computations," Johns Hopkins Univ. Press, 1996 (hereinafter "REF1");

A. L. Stolyar and H. Viswanathan, "Self-organizing dynamic fractional frequency reuse through distributed inter-cell coordination: The case of best-effort traffic," Bell Labs, Alcatel-Lucent, Technical Memo, June 2008 (hereinafter "REF2");

G. Wunder, M. Kasparick, A. Stolyar, and H. Viswanathan, "Self-organizing distributed inter-cell beam coordination in cellular networks with best effort traffic," 8th Intl. Symposium on Modeling and Optimization in Mobile, Ad Hoc, and Wireless Networks (WiOpt 2010), June 2010 (hereinafter "REF3"); and M. Kasparick and G. Wunder, "Autonomous distributed power control algorithms for interference mitigation in multi-antenna cellular networks," European Wireless 2011, Apr. 27-29, 2011, Vienna, Austria, April 2011 (hereinafter "REF4").

Embodiments of this disclosure provide systems and methods for performing Coordinated MIMO Switching (CMS) control among eNBs in a TD-LTE or FDD-LTE network (which together are often referred to as TDD/FDD-LTE) on a per-layer basis, specifically on the shared data channel. The coordination is performed on a per layer-subband basis while being cyclic across the subframes. If an eNB can assume that its neighbors will behave in a similar way, the eNB can predict the signal to interference and noise ratio (SINR) of a UE in an upcoming subframe based on its own coordination strategy, as well as the previously reported channel quality indexes (CQIs) pertaining to a similar layer-subband. This enables the eNBs to apply their power resources to the subframes and layer-subbands that would benefit the network cluster as a whole, especially in a heterogeneous network where large power imbalances can occur.

Some other power control algorithms are derived from a single receive antenna channel model. Most LTE UEs have multiple antennas and MIMO may be the default mode of operation. TD-LTE provides a number of advantages compared to FDD in order to facilitate coordination. In a TDD system, all serving and interference channel matrices can be obtained without additional overhead. This is only possible when all UEs transmit or receive on all their antennas. The embodiments disclosed herein feature power control algorithms on a per layer basis that accommodates TDD/FDD LTE with a MIMO channel model, where there is explicit inter-eNB communication. The power control algorithms are based on a network utility maximization (NUM) framework. It is assumed that the UE will be using a minimum mean square error (MMSE) receiver detection scheme with spatial multiplexing. It is noted that the algorithm does not depend on the specific UE detection scheme, since a more powerful UE detector (e.g., a maximum likelihood (ML) detector) will simply function like an equivalent MMSE detector that is placed closer to the eNB.

The performance gains of power coordination using the disclosed embodiments have been reviewed in both a single-user MIMO (SU-MIMO) and a multiple-user MIMO (MU-MIMO) operation mode. The disclosed power coordination algorithms show large performance gains in the presence of multiple transmission layers. Additionally, simulations show very good convergence characteristics. In one embodiment, the per user throughput gains from power coordination in SU-MIMO are about 63% at the cell edge, and about 47% on average. SU-MIMO is a more constrained form of MU-MIMO. In SU-MIMO, the system is restricted to scheduling the same user on all the layers in a subband, whereas in MU-MIMO, the system has the freedom to schedule any user on any layer in a subband. Thus it is expected that the impact of power control will be greater for SU-MIMO, because of this constraint. Some simulation results suggest that the gains from power control are larger for SU-MIMO than for MU-MIMO. For example, in a MU-MIMO embodiment, the gains are approximately 72% at the cell edge, and about 7% on average.

Figure 1:
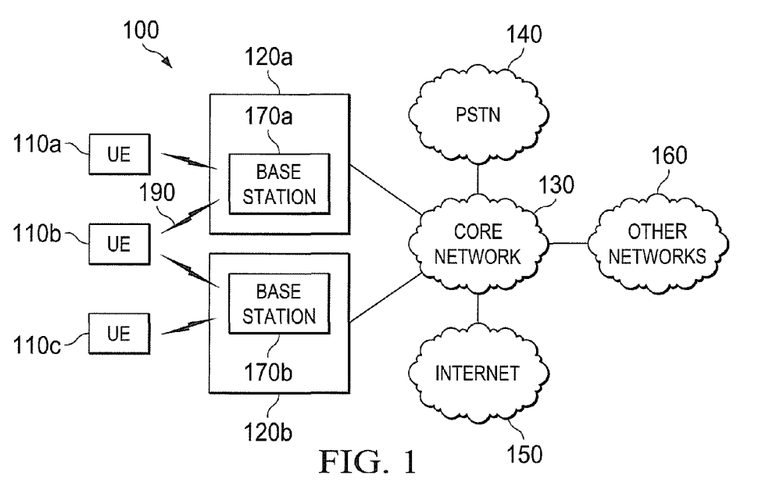
FIG. 1 illustrates an example communication system that that may be used for implementing the devices and methods disclosed herein.

FIG. 1 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home NodeB, a Home eNodeB, a site controller, an access point (AP), a wireless router, a server, a switch, or any other suitable processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described herein. In particular embodiments, the base stations 170a-170b and UEs 110a-110c are configured to implement various wireless standard including LTE, LTE-A, and/or LTE-B. Additionally, in accordance with this disclosure, one or more of the base stations 170a-170b and UEs 110a-110c are configured to communicate according to coordinated MIMO switching standards and principles. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

Figure 2A:
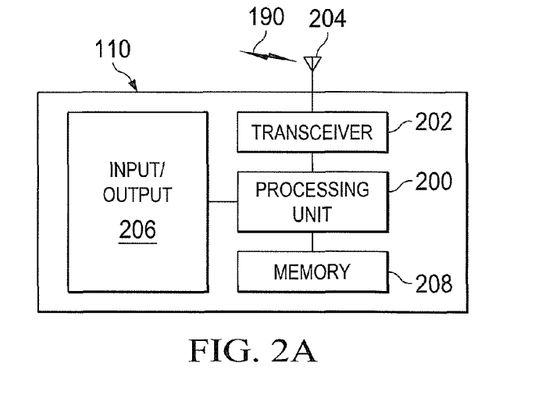
FIGS. 2A and 2B illustrate example devices that may be used for implementing the methods and teachings disclosed herein.
Figure 2B:
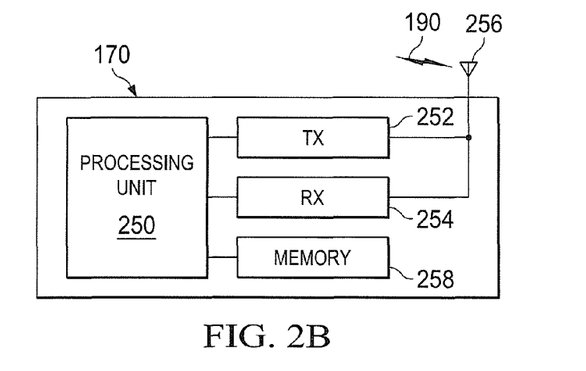

FIGS. 2A and 2B illustrate example devices that may be used for implementing the methods and teachings disclosed herein. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. For example, the processing unit 200 is configured to control or support operations of the UE 110 according to the D2D standards and principles described below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. For example, the processing unit 250 is configured to control or support operations of the base station 170 according to the coordinated MIMO switching standards and principles described below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

Embodiments of this disclosure provide power control algorithms on a per layer basis for a MIMO channel model. The algorithms are applicable to TD-LTE systems, and also to FDD systems which do not require the DL channel gain matrix at the eNB. It is noted that rank adaptation is just an extreme case of power control on the layers, where a lower rank means that the power is switched off on the higher layers, and a power re-balancing has happened. Thus, the disclosed embodiments do not require explicit rank adaptation as specified in the LTE standard, since the disclosed embodiments can control the powers on each layer individually in order to achieve a more optimum state. This disclosure also considers the more standard compliant case where the power on each layer is equal, just to see how the gradient calculation changes. For the case of individually controlled power per layer, the gradients simplify to a form similar or identical to the SISO case, where the SINR term (which is denoted herein as $S_{in,l}$) is replaced by a modified SINR term (which is denoted herein as $\hat{S}_{in,l}$).

The disclosed Coordinated MIMO Switching (CMS) embodiments perform independent power control per MIMO layer. The disclosed MU-MIMO algorithm is similar to the VSA algorithm proposed in REF4. However, unlike REF4 which only supports the TD-LTE and single receive antenna channel model, the disclosed embodiments can support TD-LTE and FDD-LTE.

In some cases, TD-LTE is advantageous over FDD, in that the channel reciprocity can be exploited. For example, the disclosed embodiments do not need to rely on PMI (precoding matrix index) feedback when uplink channel sounding is used. Also, TD-LTE removes the restrictions connected with the IPMI (interferer precoding matrix index) report as implemented in LTE Release 11, since an eNB can directly estimate the full unquantized channel matrix, for both its own UEs as well as for its neighbors. These neighbor channel estimates can then be exchanged between eNBs either directly or in some quantized form. This is only possible when all UEs sound on all their antennas, not only on their transmit antennas as is usually the case. Multiple antenna sounding is implemented in LTE Release 10 to facilitate UL-MIMO.

Alternatively, in FDD-LTE, the channel reciprocity is not applicable and the DL channel gain matrices for the serving and interfering cells may not be easy to obtain at the eNB. Embodiments of this disclosure provide a solution that does not require the knowledge of the DL channel gain matrices and it is mainly based on the reference signal received powers (RSRPs) and CQIs of the serving and interfering cells.

The framework disclosed herein fits naturally with the TDD/FDD configuration and can be applied to all combinations of the following:
 1. SU-MIMO
 2. MU-MIMO
 3. Equal powers on layers
 4. Independent powers on layers
 Coordinated MIMO Switching The Coordinated MIMO Switching (CMS) algorithm disclosed herein uses inter-eNB information exchange. This algorithm optimizes the power settings on all the eNBs by directly maximizing the cluster wide utility measure. It is noted that since rank adaptation is just as an extreme form of power control, namely an on/off power control on the second layer, this disclosure considers all UEs to be at maximum rank while the power on each layer is determined by the power control algorithm.

To illustrate the disclosed embodiments, consider a cluster of eNBs that serves a UE population $\{1 \ldots i \ldots I\}$, where the $i^{th}$ UE experiences an average rate of $X_i$, and $X = \{X_1 \ldots X_I\}$ is the vector of all average rates. The $k^{th}$ eNB serves a unique UE population defined by the set $I(k)$. Consider now a single global scheduler that tries to maximize a Utility function $U(X)$, which may include the aforementioned cluster wide utility measure. Typically a proportional fair algorithm will use a utility function given by:

$$U(X) = \sum_i U(X_i) = \sum_i \log(X_i). \tag{1}$$

The average user rate is defined by the Shannon capacity formula as:

$$X_i = \sum_{n=1}^{J} \sum_{l}^{r_i} \psi_{in} \log_2(1 + SINR_{inl}) \tag{2}$$

where J is the number of subbands, and $\psi_{in}$ is bound by $$0 \leq \psi_{in} \leq 1 \tag{3}$$

where $\psi_{in}$ represents the probability that user i will be scheduled in subband n, $r_i = \{1,2,4\}$ represents the transmission rank, and $SINR_{inl}$ represents the SINR of user i, subband n, layer l.

SISO

To better illustrate the MIMO techniques described below, a SISO example will now be described. In a SISO system, the slowfading $SINR_{in}$ of UE on the $n^{th}$ subband is defined as:

$$SINR_{in} = \frac{P_{nm} G_{im}}{N_0 + \sum_{k \neq m} P_{nk} G_{ik}}, \tag{4}$$

where $P_{nm}$ is the power of the serving $eNB_m$ and $P_{nk}$ are the powers of the interfering eNBs (i.e., the transmission power of eNB n and subband k), $N_0$ is the terminal noise level, $G_{ik}$ represents the $i^{th}$ UE's slowfade path gain to $eNB_k$, and $G_{im}$ is the $i^{th}$ UE's slowfade path gain to $eNB_m$.

MISO

In order to analyze the MISO SINR term, consider a length M channel vector:

$$a(\theta_{ik}) = [0 \ldots e^{-j\pi(M-1)\sin(\theta_{ik})}]^T \tag{5}$$

where $\theta_{ik}$ is the angular direction of $UE_i$ to the $eNB_k$ and $[\ ]^T$ represents a vector transpose. It is assumed that a beam vector $w(\phi_{nk})$ is of the same form but normalized by a term $1/\sqrt{M}$ to ensure power unity and $\phi_{nk}$ represents the beam direction of $eNB_k$ on subband n. The MISO (Multiple eNB Tx, single UE Rx) SINR is given by:

$$SINR_{in} = \frac{P_{nm} G_{im} h_{inm}}{N_0 + \sum_{k \neq m} P_{nk} G_{ik} h_{ink}}, \tag{6}$$

where $$h_{ink} = |a^H(\theta_{ik}) w(\phi_{nk})|^2 \tag{7}$$

represents the spatial component of received signal power at $UE_i$ from $NB_k$ on subband n, which is the combined channel after beamforming/precoding from $eNB_m$ to the $i^{th}$ UE on subband n, and $(\ )^H$ represents a complex conjugate vector transpose.

MIMO with Independent Power on Layers

The SINR models given in equations (4) and (6) assume that the UE has a single receive antenna. Given that the UE will have multiple receive antennas and be doing MMSE receiver processing, the MIMO SINR (which includes multiple eNB transmit antennas and multiple UE receive antennas) on the $l^{th}$ layer is given by:

$$SINR_{inl} = S_{inl} = P_{nm} G_{im} h_{iml}^H R_{inl}^{-1} h_{iml}. \tag{8}$$

Here, the precoded channel to the UE on the $l^{th}$ layer is given by:

$$h_{iml} = A_{im}^H w_{ml}, \tag{9}$$

which is the 2D expansion (vector form) of the one dimensional (scalar form) equation (7). The received interference covariance matrix at the UE is given by:

$$R_{inl} = N_0 I + \sum_k \sum_{q, q \neq l}^{r} P_{nkq} G_{ik} h_{ikq} h_{ikq}^H. \tag{10}$$

where I is the Identity matrix of size N (the number of receive antennas), and $N_0$ is the thermal noise floor at −174 dBm/Hz. It can be observed that with only one receive antenna (and consequently only one layer), equation (8) reduces to equation (6); also, equation (6) reduces to equation (4) with only one transmit antenna at the eNB.

MIMO with Equal Power on Layers

The LTE standard may require the use of equal power per layer. The result is that there are fewer degrees of freedom to optimize over, and also the presence of a "self-interference" term, because the power selected to serve on one layer will also be used as an interference term from other layers. With this restriction, the following equation is given:

$$S_{inl} = P_{nm} G_{im} h_{iml}^H R_{inl}^{-1} h_{iml}, \tag{11}$$

and the received interference covariance matrix (with the self interference term) is $$R_{inl} = N_0 I + \sum_{k \neq m} P_{nk} G_{ik} \left( \sum_q h_{ikq} h_{ikq}^H \right) + P_{nm} G_{im} \left( \sum_{q \neq l} h_{imq} h_{imq}^H \right). \tag{12}$$

Optimization Problem

The optimization problem can be stated as:
maximize U (X)
subject to $$\begin{aligned} \text{maximize} \quad & U(X) \\ \text{subject to} \quad & \sum_n P_{nk} \leq P_{max}, \forall\, k \\ & \sum_{l \in I(k)} \psi_{ln} \leq i, \forall\, n, k \end{aligned} \tag{13}$$

where U(.) is the Utility function, $P_{nk}$ is the transmission power of eNB n and subband k, $P_{max}$ is the transmission power of eNB n, and $\psi_{in}$ represents the probability that user i will be scheduled in subband n.

This optimization problem can then be written as an unconstrained Lagrangian optimization, where the objective is to maximize:

$$L(X, \mu, \lambda) = U(X) - \sum_n \sum_k \mu_{nk} \left( \sum_{l \in I(k)} \psi_{ln} - 1 \right) - \sum_k \lambda_k \left( \sum_n P_{nk} - P_{max} \right). \quad (14)$$

After the gradients have been calculated (as described below with respect to equations (19)-(22)), the updating step follows for each variable. During the power update cycle, a fast inner loop is used to update the following:

$$\psi_{in}(t+1) = \psi_{in}(t) + \beta \frac{\partial L}{\partial \psi_{in}} \quad (15)$$

$$\mu_{nk}(t+1) = \mu_{nk}(t) + \beta \frac{\partial L}{\partial \mu_{nk}}, \quad (16)$$

and a slow outer loop is used to update the following:

$$P_{nk}(t+1) = P_{nk}(t) + \beta \frac{\partial L}{\partial P_{nk}} \quad (17)$$

$$\lambda_k(t+1) = \lambda_k(t) + \beta \frac{\partial L}{\partial \lambda_k}. \quad (18)$$

As known in the art, $\lambda$ and $\mu$ in these equations are sometimes referred to as the "dual variables", and they are introduced in equation (14) to enforce the two constraints in equation (13). The value $\beta$ is a small value referred to as the "step size".

To perform the update equations in (15) to (18), the various gradient functions needed are first derived as shown below:

$$\frac{\partial L}{\partial \psi_{in}} = \frac{\partial U}{\partial X_i} \cdot \frac{\partial X_i}{\partial \psi_{in}} - \mu_{nk} \quad (19)$$

$$\frac{\partial L}{\partial \mu_{nk}} = -\left( \sum_{l \in I(k)} \psi_{ln} - 1 \right) \quad (20)$$

$$\frac{\partial L}{\partial P_{nk}} = \sum_i \frac{\partial U_i}{\partial X_i} \cdot \frac{\partial X_i}{\partial S_{in}} \cdot \frac{\partial S_{in}}{\partial P_{nk}} - \lambda_k \quad (21)$$

$$\frac{\partial L}{\partial \lambda_k} = -\left( \sum_n P_{nk} - P_{max} \right). \quad (22)$$

Each partial derivative can now be described individually. Note that $$\frac{\partial U}{\partial X_i}$$

depends on the specific utility function. For a proportional fair utility, the following applies:

$$\frac{\partial U}{\partial X_i} = \frac{1}{X_i}.$$

Given equation (2), the following can be determined as:

$$\frac{\partial X_i}{\partial \psi_{in}} = \log_2(1 + SINR_{in}),$$

and $$\frac{\partial X_i}{\partial S_{in}} = \frac{\psi_{in}}{\log(2)} \cdot \frac{1}{(1 + S_{in})}.$$

Given the definition of $SINR_{in}$ as defined in equation (8), the only remaining derivative to be calculated is $$\frac{\partial S_{in}}{\partial P_{nk}},$$

which is derived below. These calculations are separable and it is only necessary for an eNB to calculate this value for its own connected UEs, since the rest of the information will get exchanged.

MIMO Gradients

The more generalized case of multiple antennas will now be considered. The gradients for multiple antennas are derived by using the matrix inversion lemma described in REF 1, that states the following:

$$\frac{\partial R_{inl}^{-1}}{\partial P_{nkq}} = -R_{inl}^{-1}(G_{ik} h_{ikq} h_{ikq}^H) R_{inl}^{-1}.$$

Given the new definition of $SINR_{inl}$ as defined in equation (8), the following derivative can be determined as:

$$\frac{\partial S_{inl}}{\partial P_{nkq}} = \begin{cases} +\dfrac{S_{inl}}{P_{nkl}} & \forall\, i \in I(k)\ \&\ l = q \\ -P_{nnl} G_{im} G_{ik} |h_{iml}^H R_{inl}^{-1} h_{ikq}|^2 & \text{otherwise} \end{cases} \quad (23)$$

Given the restriction of equal power on different layers and a new definition of $SINR_{inl}$ as defined in equation (11), the following can be written:

$$\frac{\partial S_{inl}}{\partial P_{nk}} = \begin{cases} +C_1 & \forall\, i \in I(k)\ \&\ l = q \\ -C_2 & \text{otherwise} \end{cases} \quad (24)$$

where $$C_1 = \frac{S_{inl}}{P_{nm}} - P_{nm}G_{im}^2 h_{iml}^H R_{inl}^{-1}\left(\sum_{q \neq l} h_{imq}h_{imq}^H\right)R_x^{-1}h_{iml} \quad (25)$$

$$C_2 = P_{nm}G_{im}G_{ik}h_{iml}^H R_{inl}^{-1}\left(\sum_q h_{ikq}h_{ikq}^H\right)R_{inl}^{-1}h_{iml}^H. \quad (26)$$

Equation (23) can be written as:

$$\frac{\partial S_{inl}}{\partial P_{nkq}} = -P_{nml}G_{im}G_{ik}|h_{iml}^H R_{inl}^{-1}h_{ikq}|^2 = -\frac{G_{ik}}{G_{im}}\frac{\hat{S}_{inl}^2}{P_{nml}} \quad (27)$$

where $$\hat{S}_{inl} = P_{nml}G_{im}|h_{iml}^H R_{inl}^{-1}h_{ikl}|, \quad (28)$$

is some function of the reported SINR $S_{inl}$ as defined in equation (8).

It is noted that most of the variables above decouple according to k so that the subscript k could be dropped and each calculation could be performed per eNB. The only exception is for the calculation of the $$\frac{\partial L}{\partial \phi_{nk}}$$

and $$\frac{\partial L}{\partial P_{nk}}$$

terms that need to be exchanged among eNBs. The algorithm above can be split between a fast scheduling iteration, an inter-NB information exchange, and slow power update.

Fast Network State ($\psi$) Update

The primal dual update in equation (15) works well for small problems, but in general it may not be ideal, since the search domain size (number of UEs×number of subbands), can be quite large. Instead, each $eNB_k$ could run a Proportional Fair scheduler virtually in order to calculate $\psi_{in}$. The scheduler continuously tries to maximize the given Utility function, by selecting the $i^{th}$ UE in subframe n that would maximize $$\hat{i} = \max_i\{\nabla U_X \cdot r_n(i)\} \quad (29)$$

where $r_n(i)$ is the "commodity amount generated" or instantaneous rate improvement, in subframe n, if the $\hat{i}^{th}$ UE is selected.

Since both X and $r_n(i)$ are measured in bps/Hz, the "rate" is proportional to spectral efficiency. Then each eNB could update equation (15) where $$\psi_{in} = \begin{cases} 1 & i = \hat{i} \\ 0 & i \neq \hat{i} \end{cases} \quad (30)$$

which leads to replacing i in (21) with $\hat{i}$; this value is averaged before it gets exchanged among eNBs, as shown below:

$$\frac{\partial L}{\partial \phi_{nk}} = \frac{\partial L}{\partial \phi_{nk}}(1-\beta) + \beta\frac{\partial L}{\partial \phi_{nk}}, \forall k, n. \quad (31)$$

Here each eNB needs to calculate the effect that every other eNBs powers $$\frac{\partial L}{\partial P_{nk}}$$

(including itself) has on the currently scheduled $UE_{\hat{i}}$. Therefore, both $$\frac{\partial L}{\partial \phi_{nk}}$$

and $$\frac{\partial L}{\partial P_{nk}},$$

and subsequently $$\frac{\partial L}{\partial \phi_{nk}}$$

and $$\frac{\partial L}{\partial P_{nk}}$$

as calculated by $eNB_m$ is a matrix of size J×K, when there are K eNBs in the cluster. The use of the virtual scheduler eliminates the need to calculate $\psi_{in}$ and $\mu_{nk}$ entirely.

Inter-eNB Information Exchange

The maximum size of the information exchanged is an array of size J×K per eNB, namely $$\frac{\partial L}{\partial \phi_{nk}}(m),$$

where k=1 . . . K. In some cases, this could be a very sparse array with a size of approximately J×K×4, and its value would probably change quite slowly over time. Note that currently, the relative narrowband transmit power (RNTP) message that is exchanged between two eNBs on the X2 interface has a size of NumRB bits. The $m^{th}$ eNB will then calculate $$\frac{\partial \tilde{L}}{\partial \phi_{nm}} = \sum_{k=1}^{K} \frac{\partial L}{\partial \phi_{nm}}(k) \quad (32)$$

and $$\frac{\partial \tilde{L}}{\partial P_{nm}} = \sum_{k=1}^{K} \frac{\partial L}{\partial P_{nm}}(k) \quad (33)$$

because of the summation in equation (1), and use the results to determine how to update the power vector.

Slow Beam and Power Update

The following simplified power update is analogous to the network state search, and in most cases is very stable. This simplified algorithm updates the power vector by fixed increments, as shown in the following:

$$P_{nk}(t+1) = P_{nk}(t) + \delta_P \cdot \text{sign}\left(\frac{\partial \tilde{L}}{\partial P_{nk}}\right). \quad (34)$$

Where $\delta_P$ is a fixed value power adjustment.

Furthermore, it can be determined during each power update step whether the algorithm is still in the feasible region, that is, whether all powers are positive and all sum powers are less than maximum power. If not, the step can simply be reversed. In the power update algorithm disclosed herein, the delta power from the subband with the worst derivative is exchanged with the subband with the best derivative; in this manner, the maxi sum powers is always maintained. This simplification eliminates the need to calculate $\lambda_k$ entirely.

UE Feedback Requirements in TD-LTE

One advantage of TDD systems is that there are no restrictions to receiving channel state information in the form of PMI and IPMI reports. Due to the channel reciprocity, the eNB can directly estimate the full channel matrices to its serving UEs as well as the neighboring UEs based on channel sounding. Advantageously, interference channel matrices are obtained at no additional cost of overhead. These channel matrices can then be exchanged between eNBs, if needed. Once the channel matrices have been exchanged, the eNB can even determine what type of receiver combining the UE will perform. In essence, the eNB can determine the $h_{iml}$ and $k_{ikl}$ terms as used in (28). Additionally the received covariance matrix can be rewritten as:

$$R_{inl} = R_{intra} + R_{inter} \quad (35)$$

where the eNB can calculate the value of $R_{intra}$ by itself, and where the value of $R_{inter}$ can be obtained either by UE feedback or based on calculations from known interference channel matrices and power levels received from neighboring NBs, as well as RSRP reports received from its served UEs.

UE Feedback Requirements in FDD-LTE

In FDD-LTE, the channel reciprocity is not applicable, and it can been seen from equation (23) that the gradient computations require the knowledge of the DL channel gain matrices for the serving and interfering cells at the eNB. Ignoring the channel gain matrices on the gradient equations (23)-(28) results in highly oscillating gradients and may not achieve the optimum utility. To address this issue, two parameters are introduced: $WBCQI_{Slow}$ and $WBCQI_{fast}$. The $WBCQI_{Slow}$ parameter accounts for the dominating interferer and it can be modeled as the ratio of the long term SINR. The $WBCQI_{fast}$ parameter accounts for serving cells' fast fading. Incorporating those two parameters leads to a stable gradients behavior and trace the optimum utility:

$$\frac{\partial S_{inl}}{\partial P_{nkq}} = \begin{cases} +\dfrac{S_{inl}}{P_{nkl}} & \forall i \in I(k) \ \& \ l = q \\ -(S_{inl})^2 \dfrac{G_{ik}}{P_{nkl} G_{im}} \dfrac{WBCQI_{Slow}}{WBCQI_{fast}} & \text{otherwise} \end{cases} \quad (36)$$

where $$WBCQI_{Slow} = \frac{1}{\sum_n \dfrac{G_{in}}{G_{im}} - 1} \quad (37)$$

$$WBCQI_{fast} = S_{inl} \quad (38)$$

Equations (36)-(38) can also be applied in the case of equal power on different layers. The FDD gradient equation (36) can be further optimized by adding a punishing factor to the gradient of the serving cell. Potentially, the parameter $A_{im}$ in equation (9) can be approximated with the full rank IPMI and $w_{ml}$ with the actual precoder used by $NB_m$ on layer l.

Alternate LTE Release 11 Approach

The algorithm can be simplified greatly when the new feedback provided in Rel.11 is used, namely the CSI-RS-IM (CSI-RS with interference measurement). On closer inspection of the gradient, and writing it as a difference equation, it can be seen that:

$$\frac{\partial S_i}{\partial P_k} = \frac{S_i(P_{k1}) - S_i(P_{k2})}{P_{k1} - P_{k2}}. \quad (39)$$

Given that $P_k$ took one value during the regular CQI measurement, and it set $P_{k2}=0$, during the CSI-RS-IM CQI measurement, the gradient can be determined as:

$$\frac{\partial S_i}{\partial P_k} = \frac{S_i(P_{k1}) - S_i(0)}{P_{k1} - 0} \quad (40)$$

where $S_i(0)$ represents the CSI-RS-IM report. However, this requires that the value of $P_k$ be exchanged among eNBs.

Figure 3:
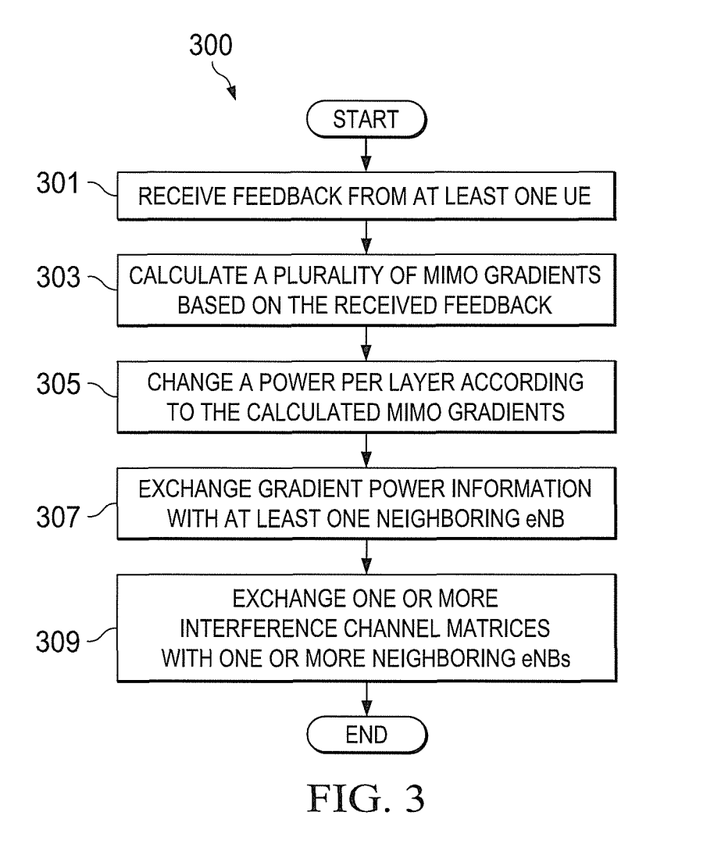
FIG. 3 illustrates an example method for coordinating downlink power per layer at an eNB in a MIMO network, according to this disclosure.

FIG. 3 illustrates an example method for coordinating downlink power per layer at an eNB in a MIMO network, according to this disclosure. For ease of explanation, the method 300 is described as being used with the system 100 of FIG. 1. In particular, the method 300 may be performed by one or more of the base stations 170a-170b. However, the method 300 could be used by any suitable device and in any suitable system or network.

At step 301, an eNB (e.g., base station 170a-170b) receives feedback from at least one UE (i.e., UE 110a-110c). For example, when the MIMO network is a TD-LTE network, the received feedback may include a CQI, a covariance matrix, a sounding on all receive antennas of the UE, or a combination of two or more of these. As another example, when the MIMO network is a FDD-LTE network, the received feedback may include a CQI, a PMI, a full rank IPMI, or a combination of two or more of these.

At step 303, the eNB calculates a plurality of MIMO gradients based on the received feedback. For example, when the MIMO network is a TD-LTE network, the eNB calculates the plurality of MIMO gradients according to equations (23)-(28). As another example, when the MIMO network is a FDD-LTE network, the eNB calculates the plurality of MIMO gradients according to equations (36)-(38).

At step 305, the eNB changes a power per layer according to the at least one calculated gradient. This may include the eNB changing the power to be different on each layer. At step 307, the eNB exchanges gradient power information with at least one neighboring eNB.

In some embodiments, at step 309, the eNB may exchange one or more interference channel matrices with one or more neighboring eNBs. For example, the eNB can measure at least one channel matrix and transmit the at least one matrix to an interfering eNB, while also receiving from the interfering eNB at least one different channel matrix.

Although FIG. 3 illustrates one example of a method 300 for coordinating downlink power per layer at an eNB in a MIMO network, various changes may be made to FIG. 3. For example, while shown as a series of steps, various steps in FIG. 3 could overlap, occur in parallel, occur in a different order, or occur any number of times.

Simulation Results

Two sets of simulation results will now be presented. The first set uses static precoders in each virtual subband for both reference and CMS in FIGS. 5 through 8 and in Table 2. The second set uses dynamic precoders in each virtual subband in Table 3. The following includes simulation results for CMS (SU-MIMO with TD-LTE) and a comparison with MU-MIMO with a single receive antenna channel model. Also included is a comparison between the channel model and FDD-LTE.

For TD-LTE, the performance of CMS (SU-MIMO with TD-LTE) is compared with a similar MU-MIMO algorithm. The SU/MU comparison is not completely analogous, since the MU-MIMO UE has only one receive antenna, while the SU-MIMO UE has two receive antennas. For that reason, only the relative gains of power control are compared to its own baseline in the SU-MIMO and MU-MIMO cases respectively. This comparison is still insightful since it provides information regarding the trade-offs of power control gains versus the inherent flexibility in the inherent technology. Indeed, if the MU-MIMO UE also had multiple antennas, even less gain from power control could be expected.

The general simulation assumptions are listed in Table 1. The performance metrics of interest are the average sector throughput (provided in terms of bps/Hz) and the fifth percentile sector throughput (edge UE throughput). The sector throughput metric demonstrates whether the resources are being efficiently utilized while the cell edge UE throughput metric demonstrates how fairly the UEs at the edge are being treated. Note that the reference here is a SU-MIMO with fixed power reference. Here the fixed precoders per virtual subbands are:

[(−49,−6), (−32,6), (−19,19), (−6,32), (6,49)]

Figure 4:
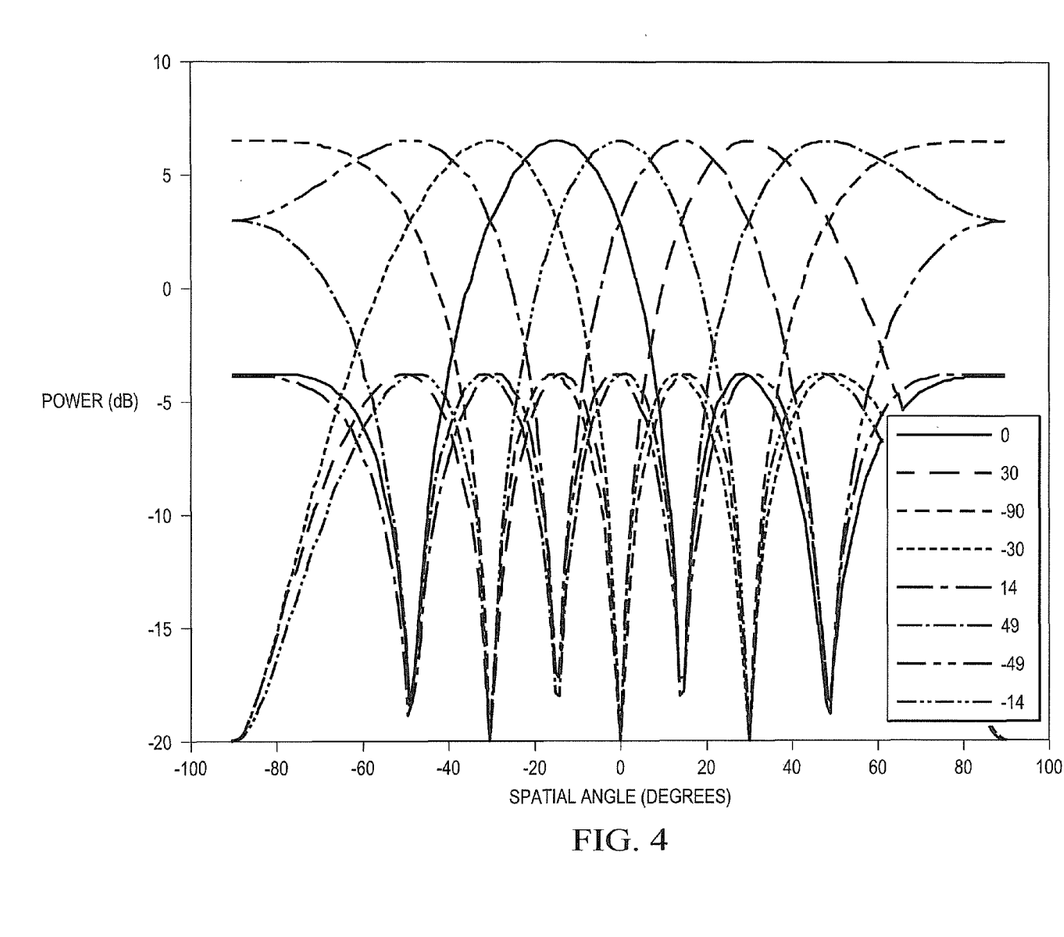
FIG. 4 illustrates spatial signatures of the first eight precoders in the LTE 4 Antenna codebook.

These correspond to angular directions in 4Tx antenna 3GPP codebook as shown graphically in FIG. 4. In FIG. 4, the spatial signature of the first eight precoders in the LTE 4Tx codebook are shown. The legends indicate the spatial direction of each beam.

TABLE 1

| Fixed Precoder TDD Simulation Parameters | |
|---|---|
| Layout | 57 Macros |
| Drops | 1 |
| CQI feedback | All SINRs are known perfectly |
| Antenna Gains | Macro is sectorized (17 dBi) |
| Antenna Number (Tx, Rx) | (4, 2) |
| Channel Model | LOS, No fast fading |
| Scheduler | Proportional Fair |
| Throughput Calculation | log2(1 + SINR) |
| UEs per Macro Sector | 10 |
| HARQ | None |
| Site to site Distance | 0.5 km |
| Precoder | None |
| RI feedback period | No Rank Adaptation |
| CQI feedback | every TTI |

Figure 5:
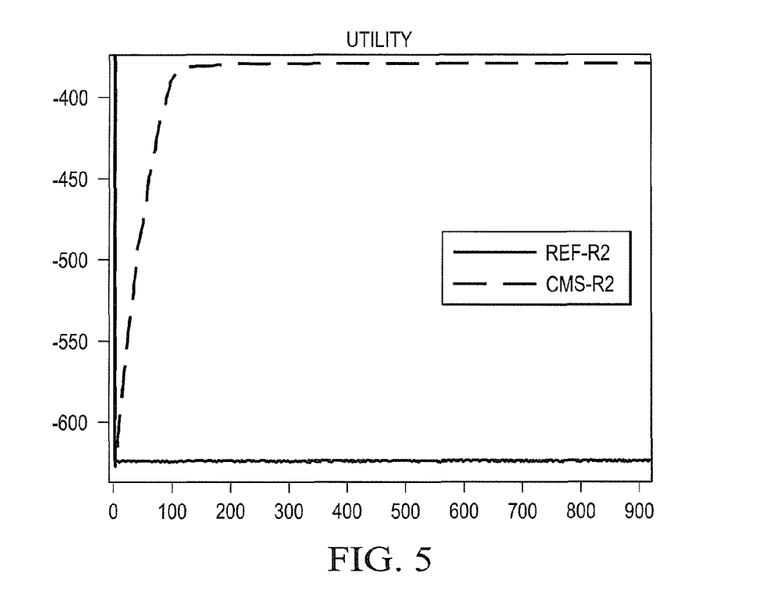
FIGS. 5 through 8 illustrate results for certain simulations of the disclosed embodiments for single-user MIMO and multiple-user MIMO.
Figure 6:
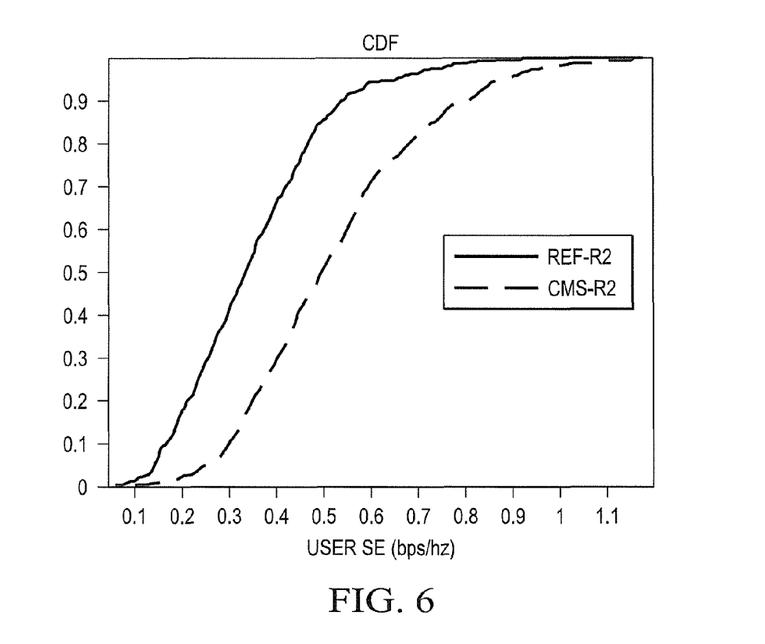

FIGS. 5 through 8 illustrate results for certain simulations of the disclosed embodiments for SU-MIMO and MU-MIMO. FIG. 5 illustrates the utility convergence results for SU-MIMO. The utility is calculated as the sum_overall_UEs{log(throughput_per_UE)}. FIG. 6 illustrates the cumulative distribution function (CDF) of the SU-MIMO user throughputs.

Figure 7:
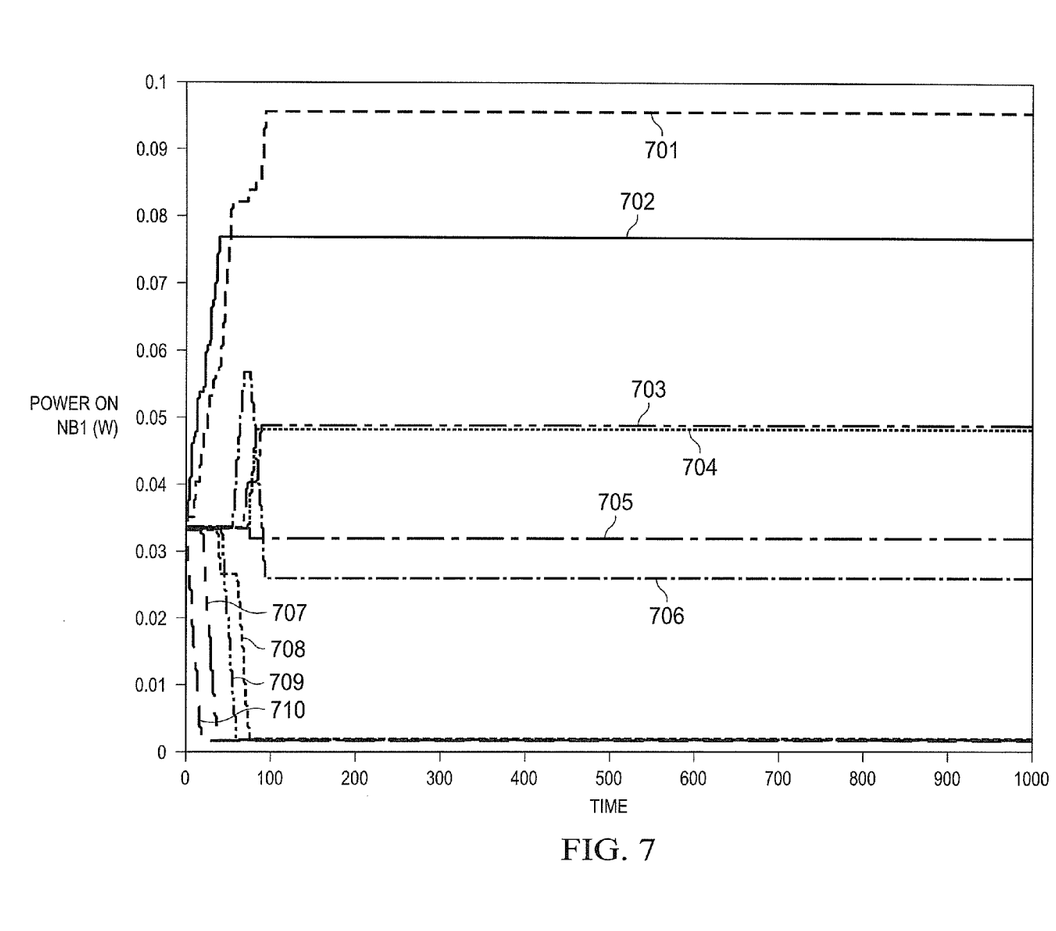
Figure 8:
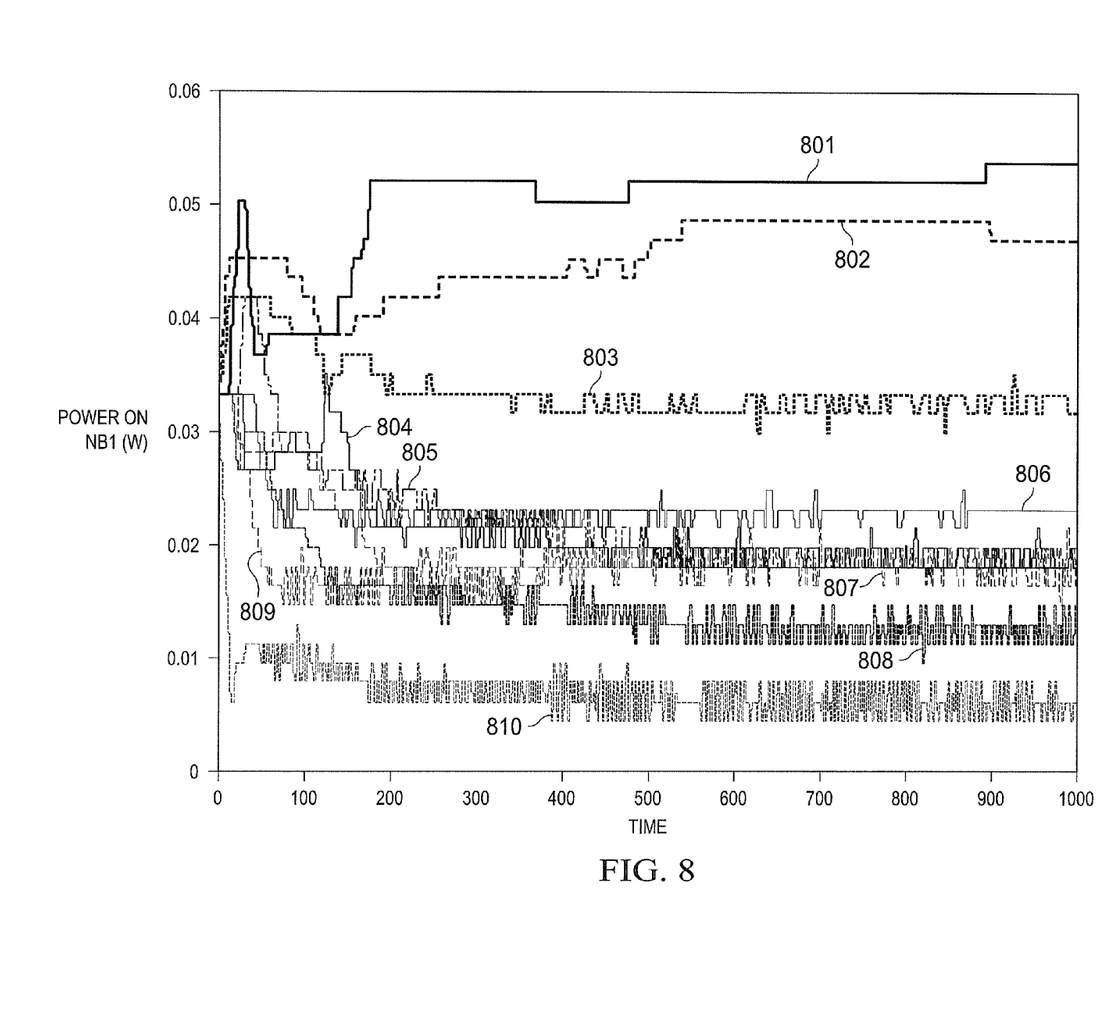

It is understood that FIG. 7 and FIG. 8 illustrate relative power curves from a single eNB. These plots are formed using Equation 34. It is understood that once the slope of the power curves is equal to 0, the curves have reached a state of equilibrium.

For FIG. 7 and FIG. 8, each plot illustrated corresponds to a single subband sampled at a discrete period of time. For example, plot lines 701 & 801 correspond to using n=1 as subband 1, plot lines 702 & 802 correspond to using n=2 as subband 2, etc.

While FIG. 7 and FIG. 8 are directed to a single eNB, it is understood that this FIG. 7 illustrates the power convergence for a plurality of virtual subbands on eNB 1 for SU-MIMO, where each plot line 701-710 represents the power convergence for a particular subband over time. FIG. 8 illustrates the power convergence for a plurality of virtual subbands on eNB 1 for MU-MIMO, where each plot line 801-810 represents the power convergence for a particular subband over time.

Note that the eNBs raise and lower the power on virtual subbands in a coordinated way. While FIGS. 7 and 8 illustrate the power curve from a single eNB, it is explicitly understood that this disclosure may be used in an enviroment with a plurality of eNB units. For example, eNB1 raises the power on virtual subband 1 and lowers the power on virtual subband 2, while eNB2 raises the power on virtual subband 2 and lowers the power on virtual subband 1. Additionally, it is understood that this disclosure may be a used in networks with a plurality of eNBs where the plurality of eNBs reach equilibrium. The relative performance of the power control schemes for both SU-MIMO and MU-MIMO are summarized in Table 2.

TABLE 2

Summary of Fixed Precoder
SU-MIMO vs. MU-MIMO power control gains

|  | SU-MIMO | MU-MIMO |
|---|---|---|
| Approximate Power Convergence time | 100 ms | 200 ms |
| AVG Gain | 47% | 7% |
| Edge Gain | 63% | 73% |
| Avg Thp | 5.2 | 5.2 |
| THP 5% | 0.25 | 0.20 |

For dynamic precoding, the performance of the CMS (SU-MIMO) is evaluated, and the performances of the TD-LTE and FDD-LTE scenarios are compared. Note that in TDD, a perfect channel knowledge of the DL channel gain matrices is assumed for the serving and interfering cells which are used in calculating the gradients. Here instead of using equations (24)-(28), equation (36) is used to calculate the gradient, which is more realistic for FDD channels. This at least partially explains the difference in performance between TDD and FDD.

The general simulation assumptions are listed in Table 3. The performance metrics of interest are the average sector throughput (provided in terms of bps/Hz) and the fifth percentile sector throughput (edge UE throughput). The reference here is dynamic precoding SU-MIMO with fixed power reference. The standard codebook is used as shown in Table 4.

TABLE 3

Dynamic Precoder Simulation Parameters

| Layout | 57 Macros |
|---|---|
| Simulation time | 2.5 seconds |
| Drops | 1 |
| CQI feedback | All SINRs are known perfectly |
| Antenna Gains | Macro is sectorized (17 dBi) |
| Antenna Number (Tx, Rx) | (2, 2) |
| Channel Model | LOS, No fast fading |
| Scheduler | Proportional Fair |
| Throughput Calculation | $\lambda \log_2 (1 + SINR/\gamma)$, where $\lambda = 0.6642$; $\gamma = 0.8904$ |
| UEs per Macro Sector | 10 |
| HARQ | None |
| Site to site Distance | 0.5 km |
| Precoder | 3GPP in Table 4 |
| RI feedback period | every 300 TTI |
| CQI feedback | every TTI, delayed by 4 TTI |

TABLE 4

3GPP Standard 2Tx Codebook

| Codebook Index | Single Layer | Two layers |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | |

The relative performance of the power control schemes for both of FDD and TDD are summarized in Table 5.

TABLE 5

Summary of Dynamic Precoder SU-MIMOs Performance

|  | REF | TDD-CMS | FDD-CMS |
|---|---|---|---|
| Power Convergence |  | 150 ms | 250 ms |
| AVG Gain |  | 1.24% | 1.84% |
| Edge Gain |  | 7.85% | 5.66% |
| Avg Thp | 2.506 | 2.537 | 2.552 |
| THP 5% | 0.074 | 0.080 | 0.078 |

Embodiments of this disclosure provide a NUM power control algorithm, referred to herein as the "CMS algorithm," where the signal model is inherently MIMO. This algorithm can be applied both in TDD and FDD modes. Compared to a TDD MU-MIMO mode, the CMS algorithm shows a significant gain in terms of performance as well as convergence and stability. The CMS algorithm can also be equally applied to an MU-MIMO operation mode. This framework fits well in a TDD environment which greatly facilitates practical implementation aspects.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for coordinating downlink power per layer independently at an enhanced NodeB (eNB) in a multiple-input, multiple-output (MIMO) network, the method comprising:

receiving feedback from at least one user equipment (UE);

calculating a plurality of MIMO gradients based on the received feedback;

changing a power per layer according to the calculated MIMO gradients; and exchanging gradient power information between the eNB and at least one neighboring eNB.

2. The method of claim 1, further comprising:

measuring at least one first channel matrix;

receiving, from an interfering eNB, at least one second channel matrix; and transmitting, to the interfering eNB, the at least one first channel matrix.

3. The method of claim 1, wherein the network is a time division-Long Term Evolution (TD-LTE) network and the feedback received from the at least one UE includes at least one of: a channel quality index (CQI), a covariance matrix, or a sounding on all receive antennas of the UE.

4. The method of claim 1, wherein the network is a frequency division duplexing-LTE (FDD-LTE) network and the feedback received from the at least one UE includes at least one of: a channel quality index (CQI), a full rank precoding matrix index (PMI), or a full rank interferer precoding matrix index (IPMI).

5. The method of claim 1, wherein the power is changed to be different on each layer.

6. The method of claim 1, wherein the network is a TD-LTE network and calculating the plurality of MIMO gradients comprises calculating according to:

$$\frac{\partial S_{inl}}{\partial P_{nkq}} = \begin{cases} +\frac{S_{inl}}{P_{nkl}} & \forall\, i \in I(k)\, \&\, l = q \\ -\frac{G_{ik}}{G_{im}} \frac{\hat{S}_{inl}^2}{P_{nml}} & \text{otherwise} \end{cases},$$

$$\hat{S}_{inl} = P_{nml} G_{im} |h_{iml}^H R_{inl}^{-1} h_{ikl}|,$$

where $$\frac{\partial S_{inl}}{\partial P_{nkq}}$$

is a MIMO gradient for UE i served by eNB n, layer l; $P_{nml}$ is a transmission power of eNB m, subband n, layer l; $G_{im}$ is a slowfade path gain of UE i to eNB m; $G_{ik}$ is a slowfade path gain of UE i to eNB k; $h_{iml}$ is a spatial component of received signal power at UE i from eNB m on layer l; $R_{inl}$ is a received interference covariance matrix at UE i, layer l, subband n; and $h_{ikq}$ is the spatial component of received signal power at UE i from eNB k on layer q.

7. The method of claim 1, wherein the network is a FDD-LTE network and calculating the plurality of MIMO gradients comprises calculating according to:

$$\frac{\partial S_{inl}}{\partial P_{nkq}} = \begin{cases} +\frac{S_{inl}}{P_{nkl}} & \forall\, i \in I(k)\, \&\, l = q \\ -(S_{inl})^2 \frac{G_{ik}}{P_{nkl} G_{im}} \frac{WBCQI_{Slow}}{WBCQI_{fast}} & \text{otherwise} \end{cases},$$

$$WBCQI_{Slow} = \frac{1}{\sum_n \frac{G_{in}}{G_{im}} - 1},$$

$$WBCQI_{fast} = S_{inl},$$

where $$\frac{\partial S_{inl}}{\partial P_{nkq}}$$

is a MIMO gradient for UE i, layer l, subband n; $S_{inl}$ is a SINR of UE i, layer l, subband n; $P_{nkl}$ is a transmission power of eNB k, subband n, layer l; $G_{im}$ is a slowfade path gain of UE i to eNB m; $G_{ik}$ is a slowfade path gain of UE i to eNB k; and $G_{in}$ is a slowfade path gain of UE i to eNB n.

8. A first enhanced NodeB (eNB) configured for coordinating downlink power per layer in a multiple-input, multiple-output (MIMO) network, the first eNB comprising:

at least one memory; and at least one processor coupled to the at least one memory, the at least one processor configured to:

receive feedback from at least one user equipment (UE);

calculate a plurality of MIMO gradients based on the received feedback;

change a power per layer according to the calculated MIMO gradients; and exchange gradient power information between the first eNB and at least one neighboring eNB.

9. The first eNB of claim 8, wherein the at least one processor is further configured to:

measure at least one first channel matrix;

receive, from an interfering eNB, at least one second channel matrix; and transmit, to the interfering eNB, the at least one first channel matrix.

10. The first eNB of claim 8, wherein the network is a time division-Long Term Evolution (TD-LTE) network and the feedback received from the at least one UE includes at least one of: a channel quality index (CQI), a covariance matrix, or a sounding on all receive antennas of the UE.

11. The first eNB of claim 8, wherein the network is a frequency division duplexing-LTE (FDD-LTE) network and the feedback received from the at least one UE includes at least one of: a channel quality index (CQI), a full rank precoding matrix index (PMI), or a full rank interferer precoding matrix index (IPMI).

12. The first eNB of claim 8, wherein the power is changed to be different on each layer.

13. The first eNB of claim 8, wherein the network is a TD-LTE network and calculating the plurality of MIMO gradients comprises calculating according to:

$$\frac{\partial S_{inl}}{\partial P_{nkq}} = \begin{cases} +\frac{S_{inl}}{P_{nkl}} & \forall\, i \in |(k)\ \&\ l = q \\ -\frac{G_{ik}}{G_{im}} \frac{\hat{S}_{inl}^2}{P_{nml}} & \text{otherwise} \end{cases},$$

$$\hat{S}_{inl} = P_{nml} G_{im} |h_{iml}^H R_{inl}^{-1} h_{ikl}|,$$

where $$\frac{\partial S_{inl}}{\partial P_{nkq}}$$

is a MIMO gradient for UE i served by eNB n, layer l; $P_{nml}$ is a transmission power of eNB m, subband n, layer l; $G_{im}$ is a slowfade path gain of UE i to eNB m; $G_{ik}$ is a slowfade path gain of UE i to eNB k; $h_{iml}$ is a spatial component of received signal power at UE i from eNB m on layer l; $R_{inl}$ is a received interference covariance matrix at UE i, layer l, subband n; and $h_{ikq}$ is the spatial component of received signal power at UE i from eNB k on layer q.

14. The first eNB of claim 8, wherein the network is a FDD-LTE network and calculating the plurality of MIMO gradients comprises calculating according to:

$$\frac{\partial S_{inl}}{\partial P_{nkq}} = \begin{cases} +\frac{S_{inl}}{P_{nkl}} & \forall\, i \in |(k)\ \&\ l = q \\ -(S_{inl})^2 \frac{G_{ik}}{P_{nkl} G_{im}} \frac{WBCQI_{Slow}}{WBCQI_{fast}} & \text{otherwise} \end{cases},$$

$$WBCQI_{Slow} = \frac{1}{\sum_n \frac{G_{in}}{G_{im}} - 1},$$

$$WBCQI_{fast} = S_{inl}$$

where $$\frac{\partial S_{inl}}{\partial P_{nkq}}$$

is a MIMO gradient for UE i, layer l, subband n; $S_{inl}$ is a SINR of UE i, layer l, subband n; $P_{nkl}$ is a transmission power of eNB k, subband n, layer l; $G_{im}$ is a slowfade path gain of UE i to eNB m; $G_{ik}$ is a slowfade path gain of UE i to eNB k; and $G_{in}$ is a slowfade path gain of UE i to eNB n.

15. A non-transitory computer readable medium embodying a computer program, the computer program comprising computer readable program code for:
  receiving feedback from at least one user equipment (UE) in a multiple-input, multiple-output (MIMO) network;
  calculating a plurality of MIMO gradients based on the received feedback;
  changing a power per layer according to the calculated MIMO gradients; and
  exchanging gradient power information between an enhanced NodeB (eNB) and at least one neighboring eNB.

16. The non-transitory computer readable medium of claim 15, further comprising computer readable program code for:
  measuring at least one first channel matrix;
  receiving, from an interfering eNB, at least one second channel matrix; and
  transmitting, to the interfering eNB, the at least one first channel matrix.

17. The non-transitory computer readable medium of claim 15, wherein the network is a time division-Long Term Evolution (TD-LTE) network and the feedback received from the at least one UE includes at least one of: a channel quality index (CQI), a covariance matrix, or a sounding on all receive antennas of the UE.

18. The non-transitory computer readable medium of claim 15, wherein the network is a frequency division duplexing-LTE (FDD-LTE) network and the feedback received from the at least one UE includes at least one of: a channel quality index (CQI), a full rank precoding matrix index (PMI), or a full rank interferer precoding matrix index (IPMI).

19. The non-transitory computer readable medium of claim 15, wherein the power is changed to be different on each layer.

20. The non-transitory computer readable medium of claim 15, wherein the network is a TD-LTE network and calculating the plurality of MIMO gradients comprises calculating according to the according to:

$$\frac{\partial S_{inl}}{\partial P_{nkq}} = \begin{cases} +\frac{S_{inl}}{P_{nkl}} & \forall\, i \in |(k)\ \&\ l = q \\ -\frac{G_{ik}}{G_{im}} \frac{\hat{S}_{inl}^2}{P_{nml}} & \text{otherwise} \end{cases},$$

$$\hat{S}_{inl} = P_{nml} G_{im} |h_{iml}^H R_{inl}^{-1} h_{ikl}|,$$

where $$\frac{\partial S_{inl}}{\partial P_{nkq}}$$

is a MIMO gradient for UE i served by eNB n, layer l; $P_{nml}$ is a transmission power of eNB m, subband n, layer l; $G_{im}$ is a slowfade path gain of UE i to eNB m; $G_{ik}$ is a slowfade path gain of UE i to eNB k; $h_{iml}$ is a spatial component of received signal power at UE i from eNB m on layer l; $R_{inl}$ is a received interference covariance matrix at UE i, layer l, subband n; and $h_{ikq}$ is the spatial component of received signal power at UE i from eNB k on layer q.

21. The non-transitory computer readable medium of claim 15, wherein the network is a FDD-LTE network and calculating the plurality of MIMO gradients comprises calculating according to:

$$\frac{\partial S_{inl}}{\partial P_{nkq}} = \begin{cases} +\frac{S_{inl}}{P_{nkl}} & \forall\, i \in |(k)\ \&\ l = q \\ -(S_{inl})^2 \frac{G_{ik}}{P_{nkl} G_{im}} \frac{WBCQI_{Slow}}{WBCQI_{fast}} & \text{otherwise} \end{cases},$$

$$WBCQI_{Slow} = \frac{1}{\sum_n \frac{G_{in}}{G_{im}} - 1},$$

$$WBCQI_{fast} = S_{inl}$$

where $$\frac{\partial S_{inl}}{\partial P_{nkq}} \quad (5)$$

is a MIMO gradient for UE i, layer l, subband n; $S_{inl}$ is a SINR of UE i, layer l, subband n; $P_{nkl}$ is a transmission power of eNB k, subband n, layer l; $G_{im}$ is a slowfade path gain of UE i to eNB m; $G_{ik}$ is a slowfade path gain of UE i to eNB k; and $G_{in}$ is a slowfade path gain of UE i to eNB n.

* * * * *